(12) United States Patent
Yang et al.

(10) Patent No.: US 8,784,137 B2
(45) Date of Patent: Jul. 22, 2014

(54) CHARGER WITH REMOVABLE CAP (75) Inventors: Chun Yang, Shenzhen (CN);
Chien-Hung Shen, New Taipei (TW);
Liang-Yi Lu, New Taipei (TW); Chao Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 89 days.

(21) Appl. No.: 13/596,060

(22) Filed: Aug. 28, 2012

(65) Prior Publication Data
US 2013/0171879 A1 Jul. 4, 2013

(30) Foreign Application Priority Data

Dec. 30, 2011 (CN) .......................... 2011 1 0453008

(51) Int. Cl.
*H01R 13/68* (2011.01)
*H01H 85/54* (2006.01)
*H01H 85/62* (2006.01)

(52) U.S. Cl.
CPC ............. *H01H 85/542* (2013.01); *H01H 85/62* (2013.01)
USPC .................................................. 439/620.28

(58) Field of Classification Search
CPC ...... H01R 13/68; H01R 24/58; H01H 85/542; H01H 85/62; H01H 2085/2065
USPC ............................................ 439/620.28, 668
See application file for complete search history.

(56) References Cited

U.S. PATENT DOCUMENTS

| | | | | |
|---|---|---|---|---|
| 3,132,224 A | * | 5/1964 | Bulgin | 337/195 |
| 4,390,225 A | * | 6/1983 | Coyne et al. | 439/332 |
| 4,486,067 A | * | 12/1984 | Wallner et al. | 439/620.28 |
| 4,536,054 A | * | 8/1985 | Wallner et al. | 439/620.28 |
| 4,762,510 A | * | 8/1988 | Schaefer | 439/620.28 |
| 4,861,285 A | * | 8/1989 | Norden | 439/620.28 |
| 4,909,761 A | * | 3/1990 | Muguira | 439/620.29 |
| 4,968,269 A | * | 11/1990 | Urani et al. | 439/620.29 |
| 4,981,448 A | * | 1/1991 | Herbert | 439/620.29 |
| 5,201,677 A | * | 4/1993 | Takayama | 439/668 |
| 5,267,879 A | * | 12/1993 | Oakley | 439/620.28 |
| 5,648,749 A | * | 7/1997 | Lin et al. | 337/205 |
| 5,687,234 A | * | 11/1997 | Chang | 379/454 |
| 5,772,473 A | * | 6/1998 | Cheng et al. | 439/620.34 |
| 5,775,952 A | * | 7/1998 | Lu | 439/668 |
| 5,847,545 A | * | 12/1998 | Chen et al. | 320/138 |
| 5,888,098 A | * | 3/1999 | Cheng et al. | 439/620.28 |

(Continued)

*Primary Examiner* — Amy Cohen Johnson
*Assistant Examiner* — Vladimir Imas
(74) *Attorney, Agent, or Firm* — Novak Druce Connolly Bove + Quigg LLP (57) ABSTRACT A charger includes a housing defining a receiving cavity, two through holes defined in the housing communicating with the receiving cavity, two slots defined in the housing, a fuse and a spring member received in the receiving cavity, a cap movably coupled to the housing, and an anode contact. The anode contact abuts between the spring member and the fuse engaging with the cap. A hooks engages in the through holes to prevent the cap from detaching from the housing, being disengageable from the through holes when pushed by a pin inserted into the through holes allowing the spring member to push the cap to move until the hooks engage in the slots. The cap is rotated a predetermined angel until the hooks are slidably received in a receiving grooves, thereby allowing the cap to be detachable from the housing through the opening.

4 Claims, 7 Drawing Sheets

(56) References Cited

U.S. PATENT DOCUMENTS

| | | | |
|---|---|---|---|
| 6,162,097 A * | 12/2000 | Liang | 439/620.27 |
| 6,527,585 B1 * | 3/2003 | Pannone | 439/504 |
| 6,544,073 B2 * | 4/2003 | Kieninger et al. | 439/620.28 |
| 6,616,484 B1 * | 9/2003 | Fan Wong | 439/620.3 |
| 6,619,983 B2 * | 9/2003 | Ota et al. | 439/558 |
| 6,695,648 B2 * | 2/2004 | Liao | 439/668 |
| 7,244,148 B2 * | 7/2007 | Maguire et al. | 439/620.28 |
| 7,294,022 B1 * | 11/2007 | Cheng | 439/668 |
| 7,611,388 B1 * | 11/2009 | Lee | 439/668 |
| 8,342,885 B2 * | 1/2013 | Jetton | 439/620.26 |
| 8,517,768 B2 * | 8/2013 | Blaha et al. | 439/620.28 |
| 2001/0051460 A1 * | 12/2001 | Ota et al. | 439/558 |
| 2008/0198615 A1 * | 8/2008 | Klipstein | 362/538 |

* cited by examiner

CHARGER WITH REMOVABLE CAP

BACKGROUND

1. Technical Field

The present disclosure relates to charger construction, and particularly, to a charger with a removable cap.

2. Description of the Related Art

Car chargers may employ a side cap attached to a main body of the charger by screws. A spring and a fuse are assembled in the charger. A user can remove the side cap from the main body by rotating the side cap, and the fuse can then be ejected out of the main body by the restoring force of the spring. However, the fuse and the cap may be pushed out of the main body too quickly for a user to catch and be lost.

Therefore, there is room for improvement within the art.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
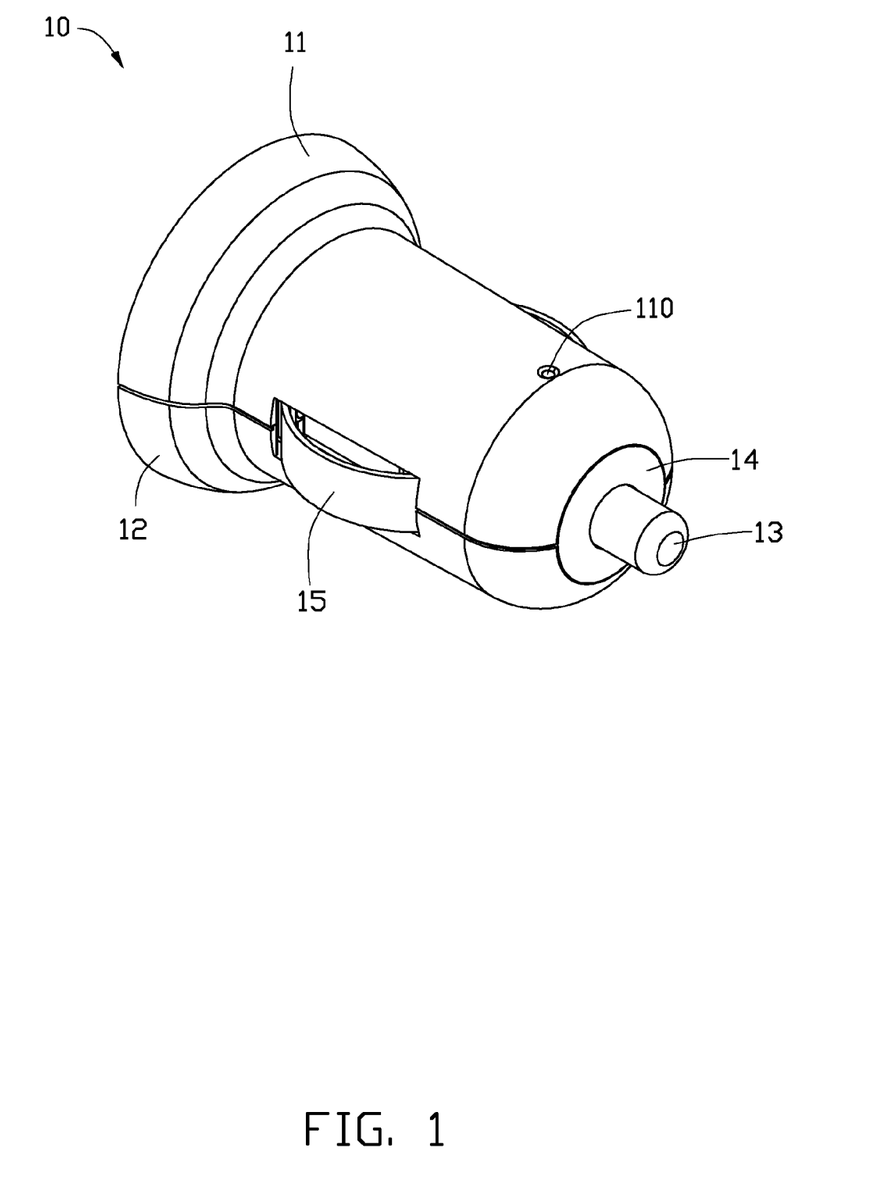
FIG. 1 is a partial assembled view of a charger in accordance with an exemplary embodiment.
Figure 2:
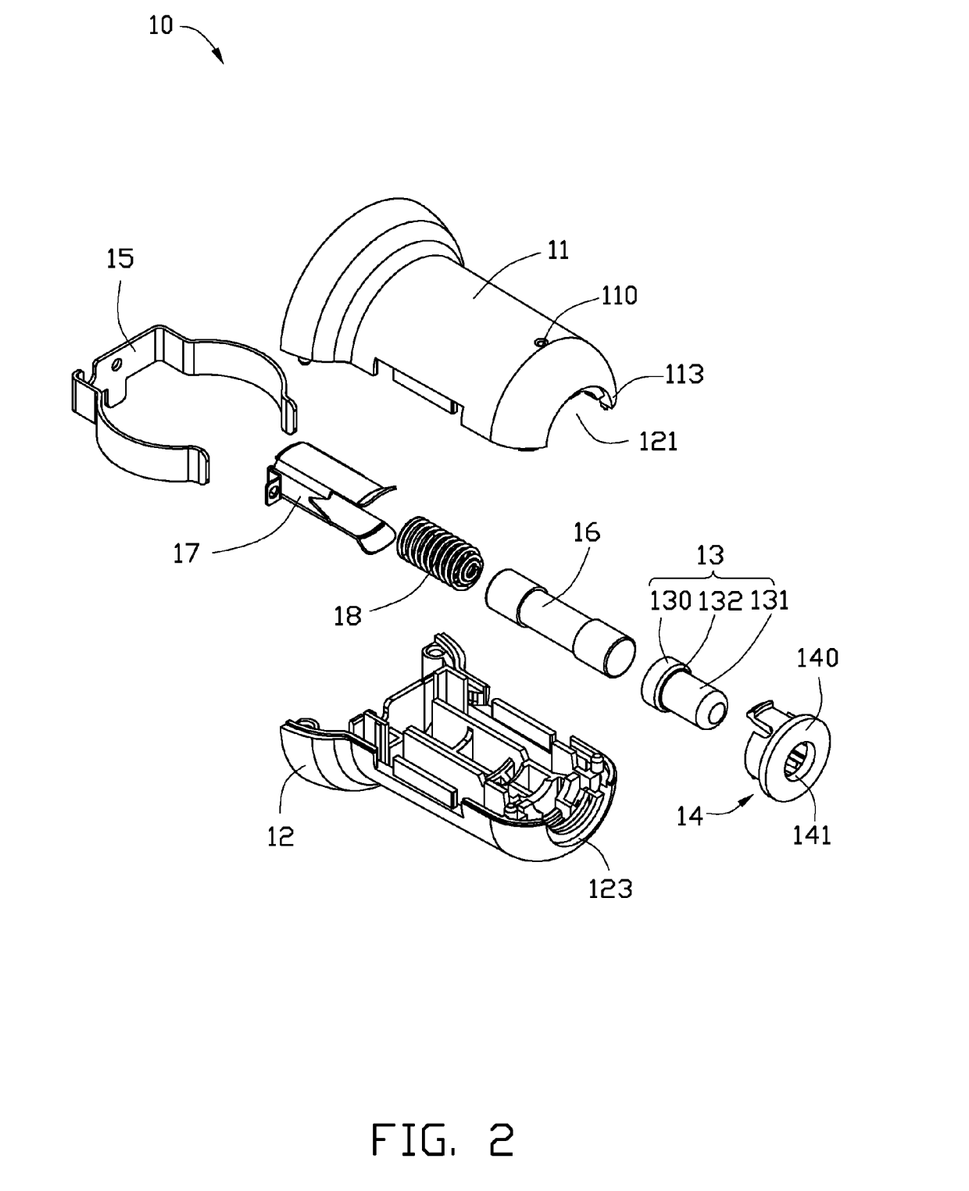
FIG. 2 is an isometric exploded view of the charger in FIG. 1.

Referring to FIGS. 1 and 2, a charger 10 includes an upper housing 11 and a lower housing 12. The upper housing 11 and the lower housing 12 are coupled to each other and cooperatively define a receiving cavity 121. The charger 10 further includes a cathode contact 15, a spring seat 17, a spring member 18, a fuse 16, an anode contact 13, and a cap 14, which are assembled in the receiving cavity 121 in sequence. The cathode contact 15 is mounted at the bottom of the receiving cavity 121. The spring seat 17 receives the spring member 18. A first end of the spring member 18 resists against the spring seat 17, and a second, opposite end of the spring member 18 resists against the fuse 16.

The cap 14 includes a main body 140, a first elastic arm 142a, and a second elastic arm 142b. An orifice 141 is defined in the center of the main body 140. The first arm 142a and the second arm 142b each protrudes from an inner side of the main body 140. The anode contact 13 includes a base 130 and a contact head 131 protruding from one end of the base 130. The base 130 is connected to an end of the fuse 16 away from the second end of the spring member 18. When the fuse 16 is retained in a normal position in the receiving cavity 121, the contact head 131 protrudes from the orifice 141. The base 130 has a diameter greater than the contact head 131, thereby forming a shoulder 132. The shoulder 132 resists against the inner surface of the cap 14, which prevents the contact head 131 from moving out of the receiving cavity 121.

Figure 3:
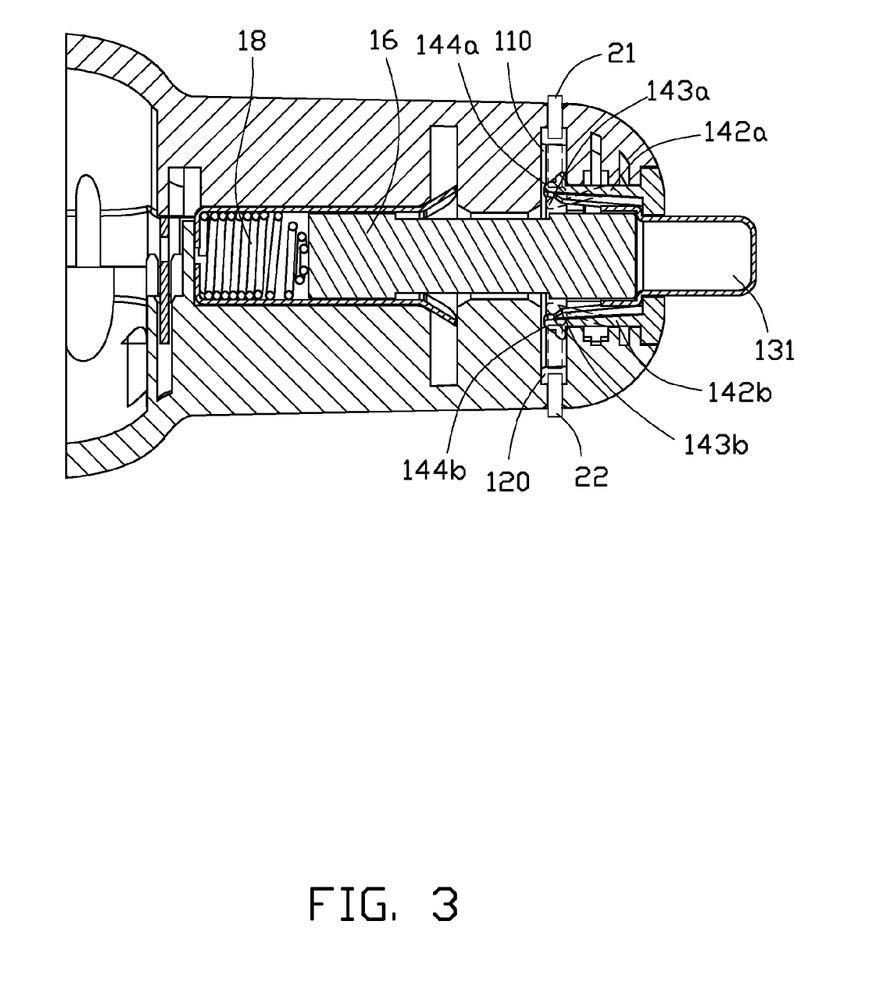
FIG. 3 is a cross-sectional view of the charger in FIG. 1 with a thin pin inserting therein.

Referring to FIG. 3, an elastic hook 143a is defined on a free end of the first arm 142a, and an elastic hook 143b is defined on a free end of the second arm 142b. A first through hole 110 is defined in a sidewall of the upper housing 11 communicating with the receiving cavity 121, and a second through hole 120 is defined in a sidewall of the lower housing 12 communicating with the receiving cavity 121. The elastic hook 143a engages with the inner side of the first through hole 110, and the elastic hook 143b engages with the inner side of the second through hole 120.

When needed, a first pin 21 and a second pin 22 can be inserted into the first through hole 110 and the second through hole 120 respectively, to push the elastic hooks 143a and 143b. The elastic hooks 143a and 143b are then urged to disengage from the inner surface of the first through hole 110 and the second through hole 120. The spring member 18 then pushes the fuse 16 and the cap 14 to move outwardly.

Figure 4:
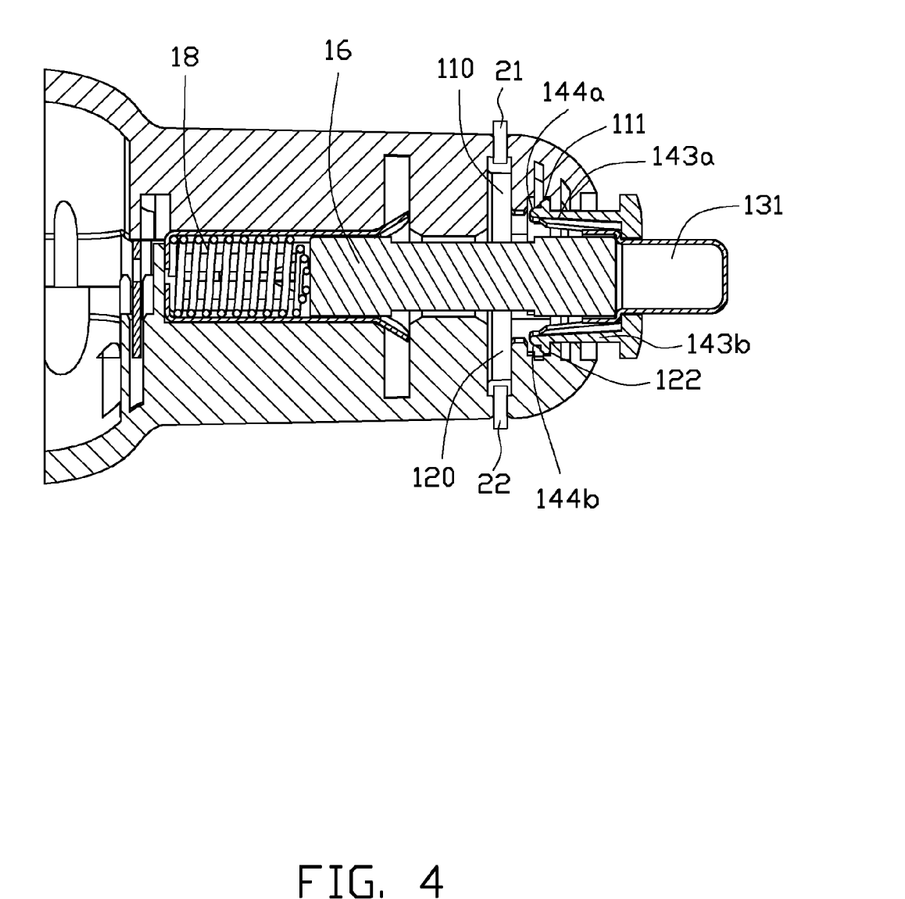
FIG. 4 is a cross-sectional view of the charger in FIG. 1 with a cap engaging with slots.

Referring to FIG. 4, the upper housing 11 further defines a slot 111 in an inner surface of the receiving cavity 121, between the first through hole 110 and an open end 113 defined in an end of the upper housing 11. The lower housing 12 further defines a slot 122 in an inner surface of the receiving cavity 121, between the second through hole 120 and an open end 123 defined in an end of the lower housing 12. In the embodiment, the slot 111 is aligned with the slot 122. When pushed by the spring member 18, the fuse 16 and the cap 14 move outwardly until the elastic hooks 143a and 143b engage in the slots 111 and 112 respectively, which prevents the cap 14 from moving out of the receiving cavity 121.

Figure 5:
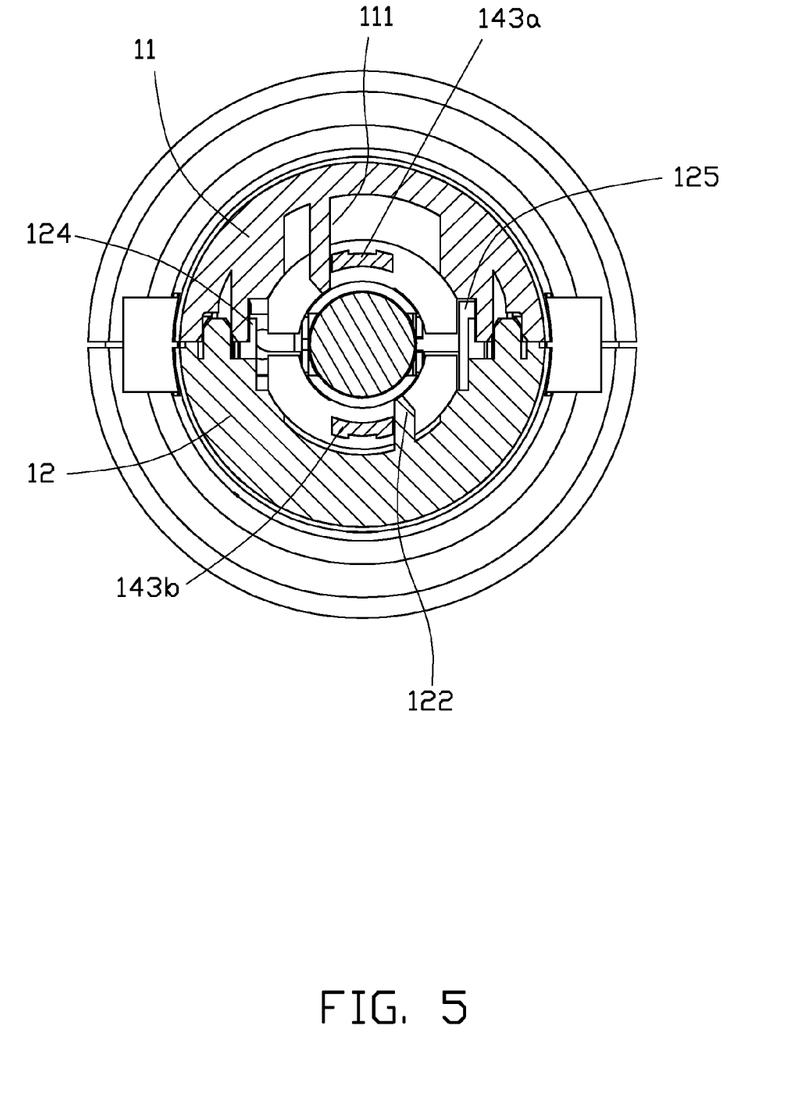
FIG. 5 is a reverse view of FIG. 4.
Figure 6:
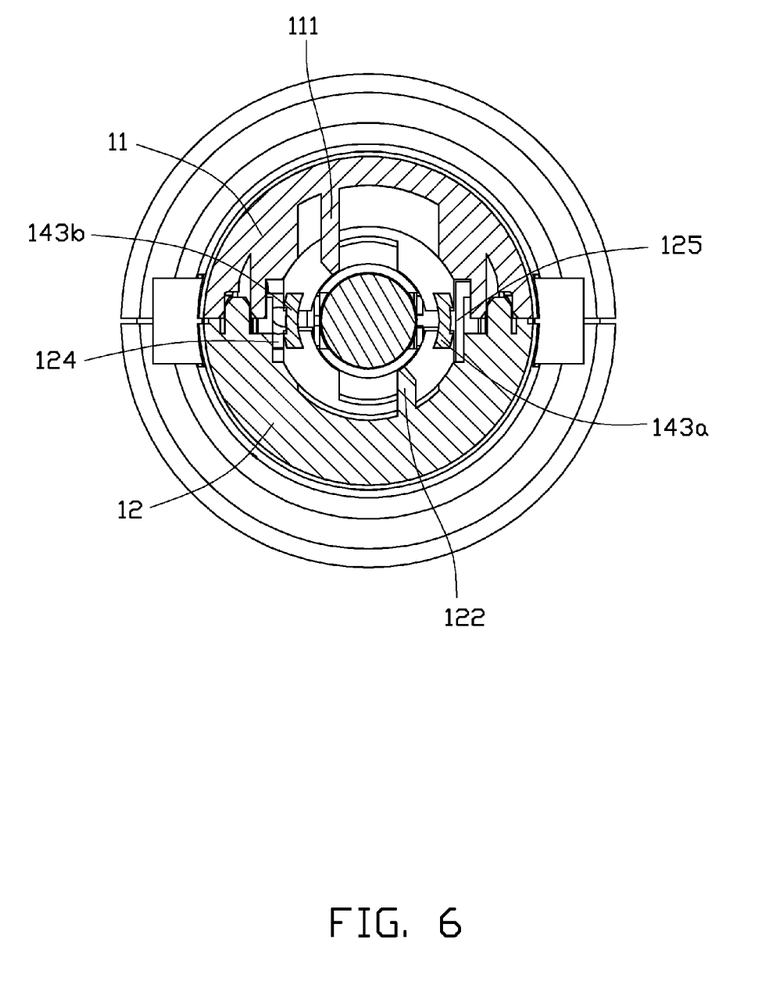
FIG. 6 is a cross-sectional view of the charger in FIG. 1, when a first arm and a second arm of the cap are received in a first receiving groove and a second receiving groove respectively.
Figure 7:
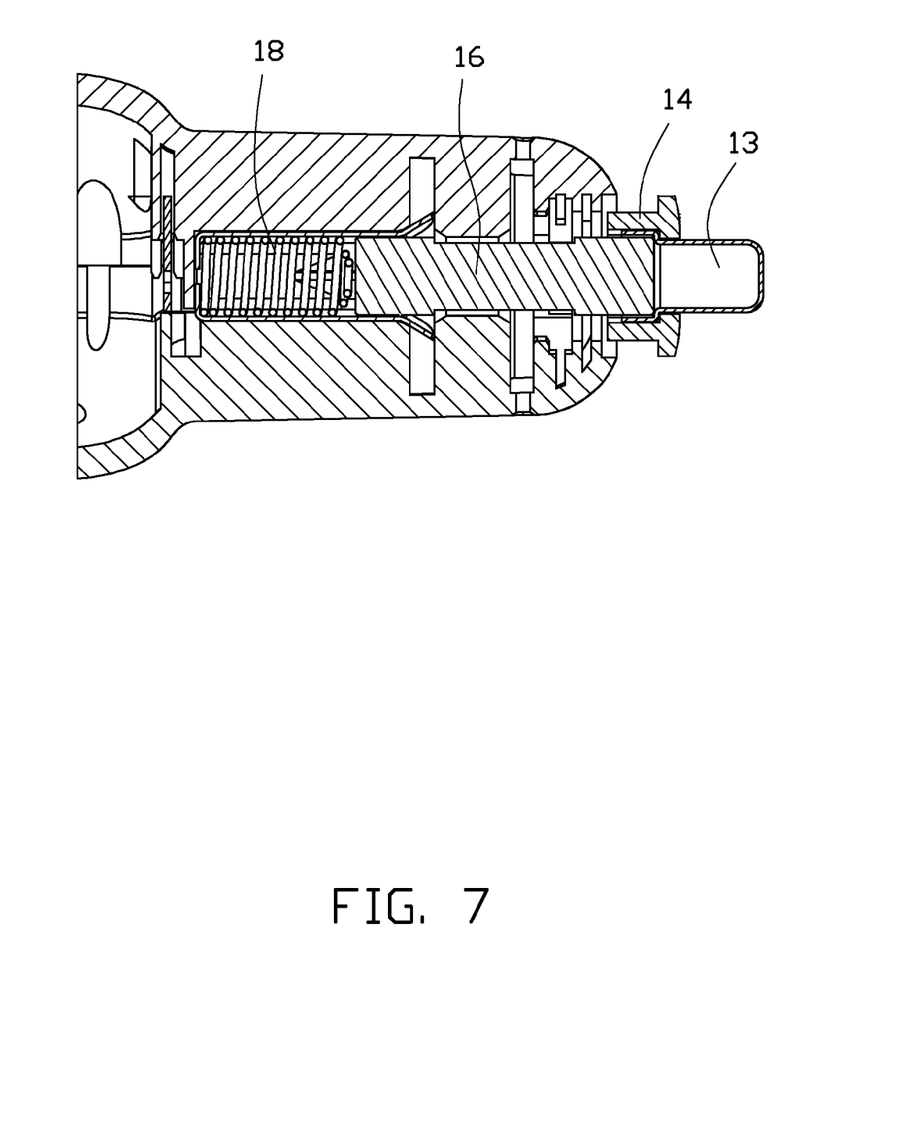
FIG. 7 is a cross-sectional view of the charger in FIG. 1 with the cap pushed out of the charger.

Referring to FIGS. 5-7, a first receiving groove 124 and a second receiving groove 125 are defined in the inner surface of the receiving cavity 121, opposite to each other. When the elastic hooks 143a and 143b engage with the slots 111 and 122, a user can rotate the main body 140 for a predetermined angel, causing the first arm 142a and the second arm 142b to rotate with the main body 140. In the embodiment, the elastic hook 143a includes an inclined face plane 144a at its free end, and the elastic hook 143b includes an inclined face plane 144b at its free end. The inclined face planes 144a and 144b resist against an edge of the slots 111 and 122 when the cap 14 rotates, causing the elastic hooks 143a and 143b to be deflected. After the ends of the elastic hooks 143a and 143b rotate into the first receiving groove 124 and the second receiving groove 125 respectively, the elastic hooks 143a and 143b rebound to be received in the first receiving groove 124 and the second receiving groove 125 simultaneously. Thus, the cap 14 and the fuse 16 are then driven by the spring member 18 to move outwardly until the cap 14 moves out of the receiving cavity 121. The user can then remove the fuse 16 from the receiving cavity 121 for repair/exchange.

In the embodiment, the first through hole 110, the second through hole 120, the first receiving groove 124, and the second receiving groove 125 are arranged in such a way that after the cap 14 is rotated 90 degrees from the position shown in FIG. 4, the ends of the elastic hooks 143a and 143b rotate into the first receiving groove 124 and the second receiving groove 125.

When a new fuse 16 has been placed into the charger 10, a user can push the first arm 142a into the first receiving groove 123 and the second arm 142b into the second receiving groove 124 simultaneously, and then push the main body 140, so that the cap 14 is received in the receiving cavity 121. Then the main body 140 is rotated to drive the first arm 142a and the second arm 142b to rotate with the main body 140 until the elastic hooks 143*a* and 143*b* engage with the inner side of the first through hole 110 and the second through hole 120 respectively.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A charger comprising:
   a housing defining a receiving cavity and comprising an open end defining an opening communicating with the receiving cavity;
   two through holes defined in a sidewall of the housing and communicating with the receiving cavity, the through holes arranged at opposite sides of the receiving cavity;
   two slots defined in an inner surface of the housing in the receiving cavity, the slots being located between the through holes and the open end;
   two receiving grooves defined in the inner surface of the housing in the receiving cavity;
   a fuse received in the receiving cavity;
   a spring member received in the receiving cavity and abutting against a first end of the fuse to apply a pushing force to the fuse;
   a cap movably coupled to the housing, the cap comprising a main body and two elastic arms protruding from the main body, the cap defining an orifice, the elastic arms each comprising a hook; and
   an anode contact in contact with an opposite second end of the fuse, the anode contact comprising a base and a contact head protruding from the base, the base engaging with an inner surface of the cap, and the contact head passing through the orifice of the cap;
   wherein the cap is disposed in a first locking position where the hooks engages in one ends of the through holes thereby preventing the cap from detaching from the housing; and the hooks are disengageable from the through holes when pushed by a pin inserted into the through holes, thereby allowing the spring member to push the cap to move outwardly to a second locking position where the hooks engage in the slots; the slots and the hooks are structured and arranged in such a way that when the cap is rotated a predetermined angel, the cap is movable from the second locking position to a third releasing position where the hooks are slidably received in the receiving grooves, thereby allowing the cap to be detachable from the housing through the opening.

2. The charger as recited in claim 1, wherein the base is connected to the fuse, the base has a diameter greater than the contact head thus forming a shoulder, which resists against the inner surface of the cap, which prevents the contact head from moving out of the receiving cavity.

3. The charger as recited in claim 1, wherein an inclined face is formed at a free end of each elastic hook, configured for resisting against an edge of the corresponding slot.

4. The charger as recited in claim 1, further comprising a spring seat receiving the spring member therein.

* * * * *